United States Patent Office 3,825,476
Patented July 23, 1974

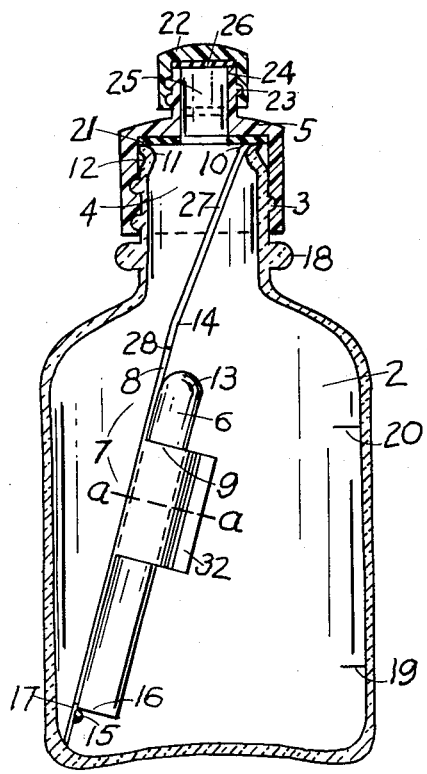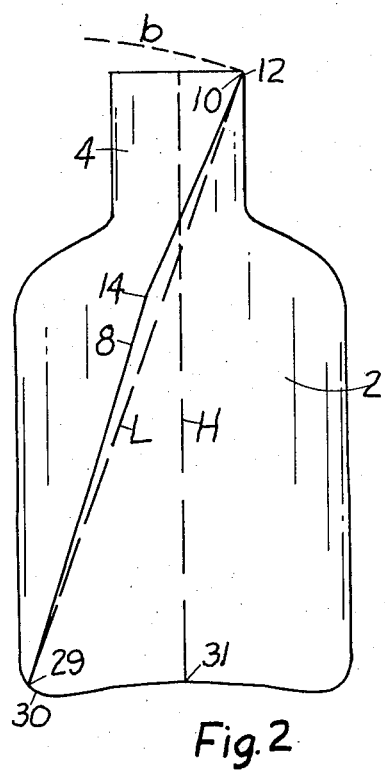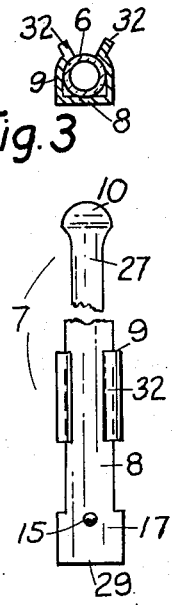

3,825,476
SAMPLER-CULTURE APPARATUS FOR THE DETECTION OF COLIFORM BACTERIAL IN POTABLE WATERS
A. Adler Hirsch, 141 Norwood St., Shreveport, La. 71105
Original application Nov. 17, 1971, Ser. No. 199,648, now Patent No. 3,708,040, dated Jan. 2, 1973. Divided and this application Oct. 2, 1972, Ser. No. 294,472
Int. Cl. C12k 1/10
U.S. Cl. 195—127
10 Claims

ABSTRACT OF THE DISCLOSURE

A go-no-go gage to determine directly whether bacterial quality of a drinking water sample meets the U.S. Public Health Service Standards in which all laboratory manipulations are eliminated from sampling to gas observation. The apparatus is creep-proof; it avoids exposures and the operations are precise. Gas from fermentation shows in a Durham vial held diagonally in a screw cap bottle by being clamped in a cage thereby eliminating all axial and lateral motion. A confirmatory Brilliant Green Bile broth tube is seeded by pressing into the screw cap and inverting, or by exchanging the auxiliary cap after inversion with a like size cap on the confirmatory vial thus obviating all extraneous utensils throughout the procedure.

---

This application is a division of my co-pending application, Ser. No. 199,648, filed Nov. 17, 1971, entitled identically herewith.

This invention consists of improvements in a specialized apparatus for determining the presence of coliform bacteria in potable waters, certain raw reservoir waters, shellfish beds, and in other aqueous environments in which low density of these bacteria is hygienically imperative.

The sanitary quality of waters intended for drinking and other uses involving bodily contact is determined by the density of coliform organisms. The standard established by the U.S. Public Health Service for culinary water supplies used in interstate commerce limits the concentration of coliform bacteria not to exceed 1 bacterium per 100 ml. of sample. This same value is observed nationwide for all public water supplies. For other quality water usages, such as in swimming pools, outdoor recreational areas and shellfish beds, the various states have set their own limiting coliform densities.

A specialized container-culture vessel to simplify the technique involved in the broth fermentation test for coliform bacteria has been described in U.S. Pat. 3,474,003.

NEED FOR IMPROVEMENT

Experience with the use of this device has indicated certain disadvantages; these include: creeping of the liquid mixture through the ground glass joint of the wide mouth stopper due to the presence of surfactant in the broth formula, imperfect control of the stance of the caged, inverted vial as the container is inverted during a test, thereby requiring several manipulations, the necessity of marking both bottle and stopper to identify the ground-in pair for use together only, the impaired visibility at the top of the vial, and the difficulty in forming the complicated cage as there illustrated. Further disadvantages are the chores required for registering the hole of the skirted ground glass stopper with that in the neck of the bottle before sterilization; also twisting this stopper to block this opening after cooling, and again a final need for attention to make sure that the holes do not meet subsequently after sampling.

Whenever the water sample is quite cold the culture mixture is subject to a false positive test caused by release of dissolved air and other gases at incubation temperature. Such bubbles cannot safely be removed from the Durham vial in wide mouth ground glass stoppered bottles by later inversions due to the creeping of liquid through the large diameter ground glass joint and consequent danger of contamination. Therefore, a positive show of gas formation becomes questionable under these circumstances.

OBJECTS

The first set of objects of the subject invention is to eliminate these flaws of the cited apparatus by providing a closure that is proof against creeping, one that is truly interchangeable between containers, one that aviods perforations in the stopper and in the neck of the bottle thereby eliminating the details involved in matching and mis-matching the vent hole, and a cage that permits better visibility of the vial and is mounted substantially steady for perfect control of fillage on a single inversion. This feature of positive fillage on inversions is highly important because it precludes errors caused by carelessness of non-technical operators.

An additional object is to provide in connection with the closure an easy positive means to inoculate a confirmatory broth test container without need for further laboratory utensiles.

A still further object is to adapt the vial holder to present only minimum interference with the introduction of the water sample, as the wide strip and the U-turn on top of the cage of Patent 3,474,003 would block the narrower closure herein proposed.

An additional object is to define and to apply the geometry of the apparatus for complete control of liquid expulsion and refill of the inverted vial, and to eliminate all free play of the vial assembly when the bottle is closed.

A further object of this invention is to describe techniques for freeing he apparatus of dissolved gases that interfere with interpretation of the primary test for coliforms and to describe techniques for inoculating confirmatory broths with liquid from a positive primary test without use or need for extraneous utensils.

SUMMARY

These objectives are achieved by using a bottle having a screw cap with a gasketed fit over its mouth, by reforming the shape of the cage for the inverted vial, and by observing a geometric requirement that the length of a rigid supporting cage be greater than the inside vertical height of the bottle but less than the diagonal distance from the bottom corner to the opposite tip of the mouth. Entrapped dissolved gases from cold samples is released by a secondary inversion after the culture has approached incubation temperature.

The provision for a secondary broth inoculation consists in topping the closure with an auxiliary pony screw cap which on interchange with that of a secondary broth container and inverting implants a small portion of the fermented primary mixture. Procedure for a secondary implant using only a plain screw cap consists in pushing the top of a confirmatory broth tube tightly against the gasket therein and inverting.

REFERENCE TO THE DRAWING

The structural details of this invention are illustrated in the drawing in which:

FIG. 1 is a vertical section of the sampler-culture bottle for coliforms fitted with a compound cap and showing the caged vial assembly in elevation, FIG. 2 is a diagram to establish the geometry for the overall length of a rigid cage to enable complete control, FIG. 3 is a cross-section across the cage and vial along axis *a—a* of FIG. 1, and FIG. 4 is an outline in elevation of the cage of FIG. 1.

SEPARATE VIEWS

Discussion is now directed to the separate views in turn. A given identification numeral signifies the same part or element throughout the drawing.

Referring to FIG. 1: The container of the sampler-culture apparatus 1 consists of a transparent bottle 2, usually of glass, having screw threads 3 preferably of the deep skirted variety, outside its narrow mouth 4 to receive a screw cap 5. An inverted vial 6, known as a Durham vial, is held to a cage assembly 7 extending obliquely the inside height of the bottle. The cage assembly comprises a spine 8, which is the supporting element, and jaws 9 for elastically clasping the Durham vial 6. A lip 10 at the top of the spine overhangs the inside arc 11 of the pouring spout 12.

Above the butt 13 of the vial is a slight bend 14 in the spine to localize its deflection and to stabilize the stance of the cage assembly. Near the bottom of the almost rigid spine 8 is a pimple 15 to prevent downward slippage of the vial and to set the lowest position of the vial mouth 16 so as to avoid possibility of glass-to-glass contact and to assure a liberal space for entry of bacteria. A spade-like widening 17 at the bottom of spine 8 further protects the bottom of the vial from striking the bottle.

Outside the bottle collar 18 is a conventional detail for strength; it serves no functional application here. Scribed on the surface of the bottle are marks 19 and 20 to denote levels for media volume and total volume with sample, respectively. In the usual case, these graduations are for 20 ml. of media and 100 ml. of sample. An annular gasket 21 under the top of cap 5 makes closure of the bottle certain. A pony cap 22 screws onto the threads 23 of a lug 24 extending atop the main cap 5. The mouth of the pony passage 25 is covered liquid-tight by gasket 26. Both gaskets 21 and 26, are biologically inert.

In the upper segment 27 of spine 8, at the level starting slightly below the mouth 4 of the bottle, indents 28 on both sides narrow its width in order to reduce inflow obstructive area to a minimum when filling the bottle with sample. The curved lip need not be so narrowed as it lies against the inside surface of the mouth 4 out of line of inflow of sample.

FIG. 2 shows diagrammatically the fundamental geometrical relationships which must be recognized to obtain complete control of the stance of a caged vial held to a rigid spine. This control is necessary in order to insure that the Durham vial is thoroughly emptied the first time the apparatus is inverted and entirely filled on the second inversion. More than a single manipulation to accomplish any given act is undesirable, inefficient, and conducive to error.

The bottom tip 29 of spine 8 sets at the inside bottom corner 30 of bottle 2; the spine extends to the top of the spout 12. The straight line length or reach of the spine is denoted by dashed line L. The internal height of the bottle from the bottom center 31 to the plane of the spout 12 is shown as dashed line H. Obviously, in order to be contained within the bottle with cap in place and enable assured control of stance, length L must exceed height H, else the cage assembly would wobble on inversion, also length L must be equal to or less than the distance between points 30 and 12 in order for the cap 5 to seat. Using point 30 as a pivot, arc b shows the path a full length spine would follow when moving from contact with the spout. Clearly it is constrained by the cap to remain positioned as shown.

The foregoing discussion presupposes an absolutely rigid spine. Actually there is some columnar deflection with metallic strips and with semi-rigid materials, hence for these the length of spine L may slightly exceed the distance between points 30 and 12 and become flexed on closure. In consequence of such a flexure the cage assembly is held even more firmly than described above. Also contributing to elastic constraint is the nature of gasket 21. When this is rubber or a similar elastomer an almost rigid spine having length L slightly exceeding the distance between points 30 and 12 will be accommodated in diagonal posture.

FIG. 3, a section along line a— a of FIG. 1, shows the method for securing the inverted vial 6 within the jaws 9 of the cage assembly 7 and the manner of forming these jaws from the stock of spine 8. The vial is inserted and pushed home against the run of the spine by first forcing open the outwardly spreading lips 32 of clamp 9.

FIG. 4, a frontal elevation of the spine of FIG. 1, shows the widening at the bottom to form a spade-like flare 17 which protects the edges of the inverted vial. Pimple 15 delimits the lowest position of the vial and also prevents its slippage downward, although the jaws 9 grasp the vial with sufficient tenacity. The upper segment 27, below lip 10 is narrower than the portion adjoining the jaws. The indent 28, as shown in FIG. 1, begins slightly below the angulation 14.

METHOD OF USE

This sampler-culture bottle is intended essentially to facilitate the examination of potable waters and samples for which high bacterial quality is routinely expected. Primarily, it shows at once whether a water sample meets the U.S. Public Health Service Standard not to exceed one coliform bacterium per 100 ml. It is simply a go-no-go gage and is definitely not a counting device. Procedure for detection of coliforms by the fermentation method is divided into two steps: the primary or presumptive test in a selective medium which permits enrichment and presumptive indication of this group, and the confirmatory test in an inhibitory medium which rules out interfering organisms that may have passed through the primary test.

*Presumptive Test*: Preferred procedure with the sampler-culture apparatus for this step is as follows:

*Preparation*: Place 4.3 grams of dehydrated Lauryl Tryptose Broth into the sampler-culture bottle and add distilled or demineralized water to the 20 ml. mark. Insert the caged or tailed vial into the bottle with the open end down. With the cap resting in place unscrewed autoclave the bottle and contents at 15 p.s.i. for 15 minutes. On releasing pressure and cooling, liquid will ascend the inverted vial. Tighten the screw cap.

*Sampling*: Sterilize the faucet or other discharge fitting by allowing it to flow full to waste for five minutes. Hold the sampler-culture bottle horizontal to empty the upturned vial. Set upright again and carefully remove the screw cap, keeping the interior sterile. Draw water sample into the bottle up to the upper or 120 ml. mark. Replace the screw cap tightly and *twirl*—avoid vertical shaking which causes froth, until the contents are thoroughly mixed. Allow the unit to set for several minutes for bubbles to surface. Invert the bottle—for best results in the plane of the vial to fill it with liquid. Only a single such inversion is required for complete displacement of air from the vial. Set the bottle upright and inspect the vial to be sure its butt is free of bubbles. Repeat the inversion step if necessary.

*Incubation*: If the temperature of the sample is quite cold it is likely to contain dissolved air and other gases well in excess of solubility at incubator temperature. To avoid a false show of gas in the vial allow the sample sufficient time, several hours if necessary, to reach surrounding temperature. Preliminary immersion in a water bath will be effective. If bubbles do collect in the butt, invert the bottle again to permit them to escape.

Unscrew the cap about one-half turn to allow aerobic conditions. Incubate at 35° C. and observe the vial for presence of gas after 24 and 48 hours, or more frequently if indicated.

*Interpretation*: Any show of gas within 48 hours indicates the presumptive presence of coliform bacteria. Actually, positive tests have been found due to coliform organisms in about 95% of the examinations making further tests for confirmation a formality in most cases.

Since a positive test means that at least one coliform bacterium is present in the 100 ml. sample, it is statistically unlikely that their concentration is exactly 1.00 per 100 ml.; therefore a positive test indicates failure to meet the U.S. Public Health Service Standards for drinking water. Such samples call for reexamination and possible sanitary or engineering action.

*Confirmed Test:* If the presumptive test is positive, screw the cap tightly on the sampler-culture bottle, invert it to wet the gasket with the fermented culture and set the bottle upright again. If a compound stopper is used, as in FIG. 1, exchange the pony cap with a similar one screwed on a vial containing sterile Brilliant Green Bile Broth and a miniature Durham vial to note secondary gas formation. Pony caps and secondary broth vial caps can be color coded to avoid confusion regarding completion of a transfer. Tilt the secondary vial to complete the transfer of the inoculum.

If an ordinary screw cap is on the sampler-culture bottle, remove the cap, lower it, without screwing, over the mouth of the test tube containing Brilliant Green Bile Broth, holding the pair together so as to press tightly against the gasket, and invert to inoculate the secondary broth. The cap may remain loosely over the confirmatory tube as a cover.

Incubate at 35° C. up to 48 hours for growth of total coliforms. A similar test for fecal coliforms can be run simultaneously inoculating as before but using EC Broth as the confirmation medium and incubating at 44½° C. for 24 hours. A show of gas in either case is a positive test.

*Generalizations:* Optimum structure for the apparatus has been described but variations and reasonable departures therefrom will still perform satisfactorily and are included within the scope of this invention and its claims. All materials employed in the construction of the caged vial assembly or the tailed vial should be unaffected by the conditions of exposure and be biologically inert.

Although a deeply skirted screw cap and a lipped pouring spout is illustrated in FIG. 1, a conventional screw cap is satisfactory. The top of the spine of the caged vial assembly may have any sort of end instead of the lip as shown, provided its continued pressure on the gasket is not damaging. Other means for clamping the vial to the spine, without interference with observations for gassing, is contemplated but these do not stray from the basic principles stated in the description and the claims. Features of the spine may likewise be varied but the basic requirements still adhere. Thus the angulation above the vial may be either eliminated or increased. An increase is desirable when a smaller volume of sample is to be tested.

I claim:

1. A combination sampler-culture apparatus for detecting the presence of coliform bacteria in sanitary water supplies comprising
   a bottle of transparent, autoclavable material, having a mouth of narrow diameter in comparison with the diameter of the body of said bottle,
   means for positive, creep-proof closure of said bottle,
   an inverted vial assembly mounted within said bottle for observation of gas formation,
   said vial assembly comprising an inverted vial of transparent, autoclave material spine means and attachment means to hold said inverted vial to said spine means,
   said spine means extending the length of said vial assembly obliquely from the corner at the bottom of said bottle to the top of the mouth of said bottle diagonally opposite thereto so that said vial assembly is bound therebetween when said closure is in place,
   said spine means being of small obstructive area within and slightly below said mouth relative to the cross sectional area of said mouth in order to minimize interference with the entry of water sample from an external fixture into said apparatus,
   said vial assembly permitting a clear view along all parts of said vial to allow identification of the meniscus of a bubble.

2. A combination sampler-culture apparatus for determining the presence of coliform bacteria in public water supplies comprising
   a transparent bottle of autoclave material having a narrow mouth compared to the body thereof, a screw cap thereon, a gasket between said screw cap and the top of said bottle,
   an inverted vial assembly positioned inside said bottle for observation of gas formed as a result of the presence of coliform bacteria, said vial assembly comprising
   a transparent inverted vial and
   a rigid, elongated cage to protect said vial against breakage and bind it in an oblique stance when said screw cap is tightened,
   said cage comprising an elongated spine and a clasp to hold said inverted vial thereto,
   the length of said spine being at least equal to the vertical height of said bottle but not exceeding substantially the distance between a point on the bottom corner of said bottle to the top of its mouth diagonally opposite thereto.

3. The apparatus of claim 2 in which said spine is bent at a slight angle above the butt of said inverted vial in the direction thereof.

4. The apparatus of claim 2 in which the top of said spine is lipped to engage the inner surface of said mouth of said bottle.

5. The apparatus of claim 2 in which the upper segment of said spine above the butt of said inverted vial is narrower in width than the lower segment thereof in order to minimize obstruction to entry when drawing a water sample and to localize flexing when said screw cap is tightened.

6. The apparatus of claim 2 in which said vial is mounted in said cage with a spacing between its open end and the bottom of said bottle.

7. The apparatus of claim 1 in which the top of said mouth of said bottle is curved to form a pouring spout.

8. The apparatus of claim 2 in which said screw cap is the deeply skirted variety.

9. The apparatus of claim 2 fitted with a pony cap on the top of said screw cap, screw threads on a projection from the top surface of said screw cap to receive mating screw threads inside said pony cap.

10. The apparatus of claim 4 in which a gasket seals said pony cap atop said screw cap.

References Cited
UNITED STATES PATENTS 3,474,003  10/1969  Hirsch  _____ 195—127

A. LOUIS MONACELL, Primary Examiner

R. J. WARDEN, Assistant Examiner

U.S. Cl. X.R.

195—103.5 R, 139